No. 12,625. REISSUED MAR. 26, 1907.
G. H. WILLIAMS.
GRADUATED REINFORCED ARCHED ANGLE BAR FOR RAILWAY TRACK JOINTS.
APPLICATION FILED FEB. 20, 1907.
2 SHEETS—SHEET 1.
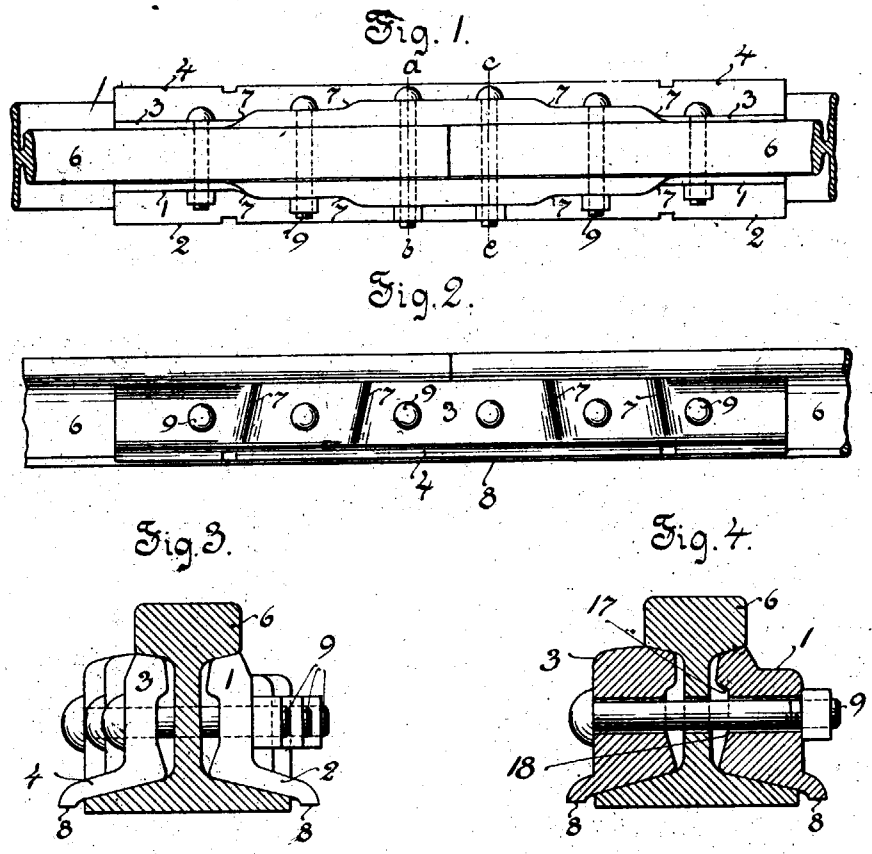
Witnesses:
Mortave Browne.
Henry Thiemann.
Inventor
Geo. H. Williams
By Brown & Rivard
his Attorneys No. 12,625. REISSUED MAR. 26, 1907.

G. H. WILLIAMS.

GRADUATED REINFORCED ARCHED ANGLE BAR FOR RAILWAY TRACK JOINTS.

APPLICATION FILED FEB. 20, 1907.

2 SHEETS—SHEET 2.

Witnesses:
Upshaw Browne.
Henry Sheine

Inventor
Geo. H. Williams
By Brown & Eward
his Attorneys

UNITED STATES PATENT OFFICE.

GEORGE HUGHS WILLIAMS, OF KANSAS CITY, MISSOURI, ASSIGNOR TO RAILWAY SUPPLIES, LIMITED, OF TORONTO, CANADA, A CORPORATION.

GRADUATED REINFORCED ARCHED ANGLE-BAR FOR RAILWAY-TRACK JOINTS.

No. 12,625. Specification of Reissued Letters Patent. Reissued Mar. 26, 1907.

Original No. 714,422, dated November 25, 1902. Application for reissue filed February 20, 1907. Serial No. 358,762.

*To all whom it may concern:*

Be it known that I, GEORGE HUGHS WILLIAMS, a citizen of the United States, residing at Kansas City, in the county of Jackson and State of Missouri, have invented new and useful Improvements in Graduated Reinforced Arched Angle-Bars for Railway-Track Joints, of which the following is a specification.

My invention relates to a graduated reinforced arched angle-bar for making railway-track joints for connecting the ends of the rails.

The object of my invention is to provide a sufficiently heavy mass of metal under the heads of the rails at their ends to strengthen the joint and to resist the blows of the wheels of the passing trains.

Figure 5:
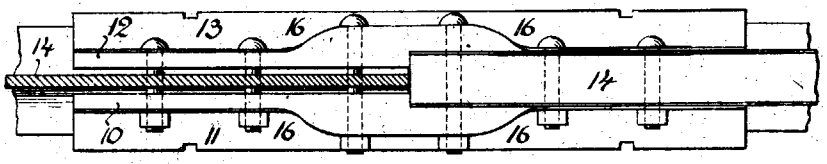
Figure 6:
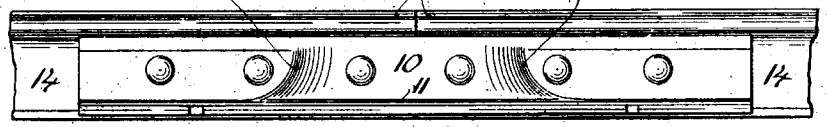

Referring now to the drawings, Figure 1 is a top plan view of the preferred form of my invention—that is, a pair of angle-bars having graduated reinforcements and applied to the abutting ends of two rails. Fig. 2 is a side elevation of the rails and the outer angle-bar. Fig. 3 is an enlarged end elevation of the angle-bars shown in Fig. 1, the rail being in section. Fig. 4 is a correspondingly-enlarged transverse section taken on line *a b* or *c e* of Fig. 1. Fig. 5 is a top plan view of a modification—a pair of reinforced angle-bars applied to a rail-joint, the head of one rail being cut away. Fig. 6 is a side elevation of the outer angle-bar shown in Fig. 5.

Referring to Figs. 1 to 4, illustrating the preferred form of my invention, 1 2 designate the inner angle-bar—that is, the one which lies against the inner side of the track—and 3 4 designate the outer angle-bar. Each angle-bar comprises an upright portion 1 or 3, occupying a position alongside the web of the rails, and a foot portion 2 or 4, which rides upon the base of the rails 6.

My invention consists in thickening the metal composing the upright portions 1 and 3 of the angle-bars for the greater portion of their length, the greatest thickness being at the middle and the thickness of the adjacent portions being less than that of the middle portion, but greater than that of the ends. I am aware of patents on angle-bars for rail-joints having their upright portions thickened or reinforced by a series of thicknesses graduating from the middle of the bar each way toward the ends and in some respects similar to my invention; but the patent issued to Sellers September 25, 1883, No. 285,688, to others than the practical observer would appear the same as mine, while the actual difference in construction could and would be readily pointed out by a mechanic or the practical observer. This formation provides a graduated reinforcement of the angle-bars for the purpose of resisting the pounding blows of car-wheels upon the ends of the rails. At the ends of the rails, where the effect of these blows is the greatest, I place the maximum thickness of metal in the angle-bars. Hence the angle-bars have the greatest strength where such is required. At distances of several inches from the ends of the rails the shocks caused by the passage of car-wheels are not so severe, and the thickness of the vertical portion of each angle-bar is reduced proportionately, as shown. This graduation of the thickness of the bar might be effected by tapering the outer face of the bar (the upright portion thereof) in straight lines; but I prefer to make the outer face or faces of each said portion parallel to the rails, as shown, excepting certain portions 7, where shoulders are formed by the changes of thickness of the bar. The purpose of providing such parallel faces is to provide the necessary perpendicular bearings for the bolt-heads and nuts. The profiles of these shoulders (as seen in plan) form compound curves connecting the otherwise straight outer faces of the upright portions 1 and 3.

The reinforcements or thickened portions of the inner angle-bar 1 2 do not extend so high as the reinforcements of the outer angle-bar 3 4 on account of the clearance required for car-wheel flanges; but they do extend above the neck 17 of the cove 18 on the inner face of the bar, and so serve to strengthen the bar at the point where it is most liable to break.

The upper outer edges of the angle-bar meet the lower edges of the heads of the rails, as shown.

At the outer edge of each angle-bar is a downwardly-curved spiking-flange 8.

The inside faces of the angle-bars are so shaped that spaces will be left between them and the webs of the rails, so that it will be possible to draw the angle-bars closer together by the bolts 9 in case of wearing of said bars. These angle-bars may be bolted with either six or four bolts, according to the length of the bars.

The thickness of the middle portions of the upright portions 1 and 3 should be one inch or more. The reinforcements bear immediately over the flanges or base of the rails, and this arrangement of the reinforcements has evident advantages over those reinforcements which project laterally beyond the base of the rails.

The reinforced portions of the angle-bars having a direct bearing over and upon the base or flange of the rail, with the bars' upper bearing under the head or ball of the rail, and the bars being held firmly against the rail by the track-bolts give the joint the same solidity and strength as the body of the rail and cause the joint to take the same wave motion or deflection as the rail proper during the passage of the trains.

The reinforcements between the ends and the middle portions of the angle-bars may be omitted, as shown in Figs. 5 and 6. In these views, 10 11 and 12 13 designate, respectively, a pair of angle-bars, and 14 the rails connected thereby. The central portion of the outer face of each angle-bar forms a swell, caused by the greater transverse thickness of this portion. The reinforcement is graduated to some extent by means of the curves 16, connecting the thickened portion to the normal side or face of the angle-bar. The rate of change in the degree of reinforcement in this form of bar is not so gradual as in my preferred form; but the support afforded to the extreme ends of the rails is equal to that afforded by said preferred form.

What I claim is—

The combination with two abutting ends of railway-track rails, of a pair of reinforced graduated angle-bars and bolts passing through the reinforced graduated portions and the web of the rail, the reinforcement on the face of the inside bar having its upper end located above the neck of the cove in the face of the bar and at the same time out of the path of the flange of a car-wheel passing along the track.

In testimony whereof that I claim the foregoing as my invention I have signed my name, in the presence of two witnesses, this 9th day of February, 1907.

GEORGE HUGHS WILLIAMS.

Witnesses:
L. M. ALLYN,
J. B. SHELBY.